Jan. 10, 1961   M. M. ROSENFELD   2,967,494
PUBLIC BOMBSHELTER
Filed April 14, 1958
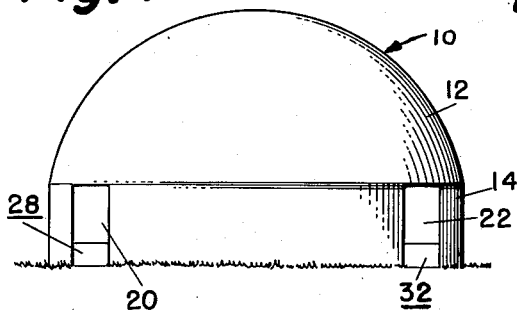
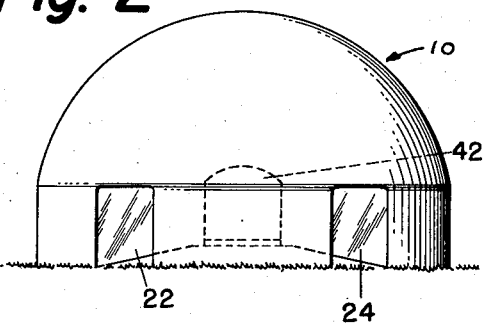
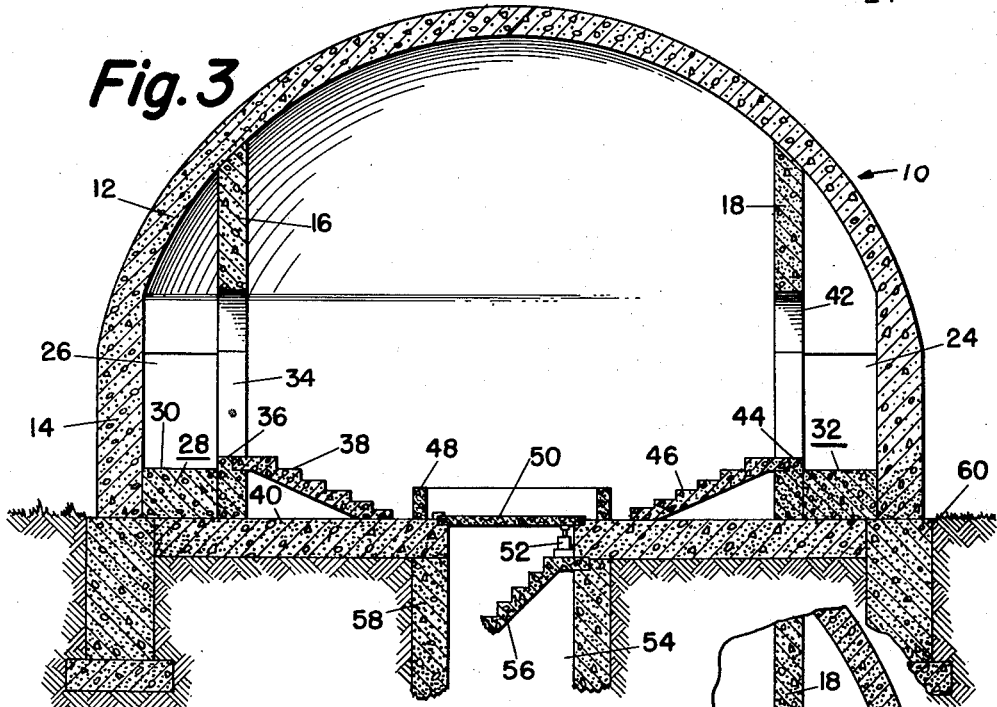
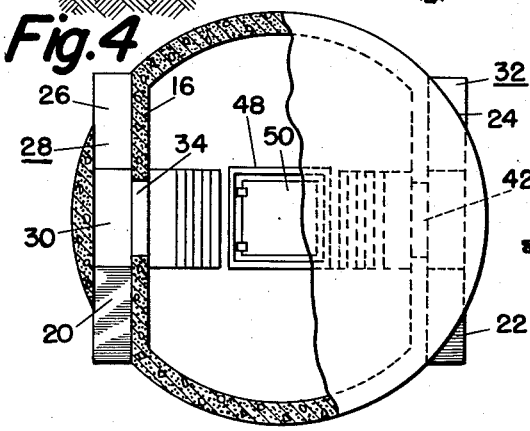
INVENTOR.
MORTON M. ROSENFELD
BY Arthur H. Seidel
ATTORNEY

# United States Patent Office 2,967,494
Patented Jan. 10, 1961

2,967,494

PUBLIC BOMBSHELTER

Morton M. Rosenfeld, Mount Vernon, N.Y.
(271 Madison Ave., New York, N.Y.)

Filed Apr. 14, 1958, Ser. No. 728,118

6 Claims. (Cl. 109—1)

This invention relates to a public bombshelter, and more particularly to a public bombshelter to be used in urban areas undergoing severe bombing, and located a spaced distance from the center of a nuclear explosion.

The tremendous explosive power of nuclear weapons has resulted in a capacity for dealing destruction beyond that heretofore envisaged. In the nuclear bombing of a city, destruction of the major water carrying conduits and sewerage conduits is a certainty, at least in the region proximate to ground zero. Under these circumstances, persons taking shelter in conventional bombshelters of the type used in World War II even though situated a sufficient distance from the region of the nuclear explosion undergo the real danger of death through drowning resulting from broken water mains and sewerage pipes. Furthermore, flooding of the streets in all parts of a bombed city is highly probable so that even access to a bomb-shelter may prove difficult for persons who are present in an area sufficiently distant from the site of the nuclear explosion to escape direct injury therefrom, but who are still located in a region wherein the water and sewerage conduits are destroyed.

This invention has as an object the provision of a public bombshelter.

This invention has as another object the provision of a public bombshelter which accords its occupants maximum protection from the flooding following the disruption of water and sewerage conduits within a city.

This invention has as yet another object the provision of a public bombshelter which permits facile access to the shelter area notwithstanding the flooding of the streets about the shelter.

This invention has as yet another object the provision of a public bombshelter in which the entrance is protected from being completely blocked by debris and rubble resultant from a nuclear or other major bombing.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings, wherein like reference characters refer to like parts;

Figure 1 is an elevational view of one embodiment of the public bombshelter of the present invention.

Figure 2 is an elevational view of the public bombshelter of the present invention shown in Figure 1 taken at right angles to Figure 1.

Figure 3 is a vertical sectional view of the public bombshelter of the present invention shown in Figure 1.

Figure 4 is a plan view, partly in section and partly in elevation.

Figure 5 is a fragmentary vertical sectional view revealing a modification of the public bombshelter of the present invention.

Referring to the drawings and initially to Figures 1 through 4 inclusive, the public bombshelter of the present invention is designated generally as 10. Such public bombshelter 10 comprises a portion disposed above ground level, and a portion disposed below ground level. The present invention deals entirely with the portion of a public bombshelter disposed above ground level. Any of the wide variety of subterranean bombshelter constructions presently known may be utilized with the public bombshelter construction of the present invention.

The public bombshelter 10 has an outside configuration that is preferably substantially in the shape of a hemisphere, namely the dome 12 and the base 14. A hemisphere is to be preferred because of the superior strength characteristics conferred by this geometrical configuration. However, other configurations including prismatic constructions having a rectangular cross-section or conical structures may be utilized.

The preferred construction material for forming the shell of public bombshelter 10 comprising the dome 12 and the base 14 comprises reinforced concrete, although metal or other materials may be utilized.

The dome 12 is preferably hollow and is supported by the wall forming the base 14 and by interior buttresses 16 and 18.

The public bombshelter 10 is provided with four entrances 20, 22, 24, and 26, which are spaced about the base 14, with one entrance being disposed in each of the four quadrants comprising the circular base 14. As seen particularly in Figure 4, the entrance 20 is juxtaposed to the entrance 26, and the entrance 22 is juxtaposed to the entrance 24. The entrances 20, 22, 24, and 26 extend from the ground level to the bottom of the dome 12.

A ramp 28 extends intermediate the entrances 20 and 26, and as seen particularly in Figure 4 passes from within the public bombshelter 10 to the outside thereof. The ramp 28 is inclined upwardly from each of the entrances 20 and 26 to reach a central plateau 30 disposed midway between the entrances 20 and 26. The plateau 30 is the highest point of the ramp 28, such ramp 28 descending down to ground level on either side of the plateau 30. A similar ramp 32 to ramp 28 is disposed intermediate entrances 22 and 24.

The buttress 16 is provided with an opening 34 adjacent the plateau 30. Such opening 34 has a length (measured along a chord of the circle defined by the base 14) somewhat less than the length of the plateau 30. The floor 36 of opening 34 is spaced somewhat above the plateau 30 so as to form a curb adjacent plateau 30.

A series of steps 38 extend from the reinforced floor 40 within the interior of public bombshelter 10 to the floor 36 of opening 34. For maximum strength, the opening 34 may be arch-shaped.

An opening 42, which is substantially identical to opening 34, is provided in buttress 18, the opening 42 bearing the same relationship to the ramp 32 as does the opening 34 to the ramp 28. Thus, the opening 42 is provided with a floor 44 and steps 46 which resemble the floor 36 and the steps 38.

In the center portion of the public bombshelter is the rectangular curb 48 which surrounds the entrance cover 50. The rectangular curb 48 is preferably formed of concrete and rises from the reinforced floor 40 of public bombshelter 10. The rectangular curb 48 should be about the height of two steps.

The reinforced floor 40 is notched to provide a watertight seat for the cover 50. The cover 50 is formed of concrete, steel, or lead-coated steel, or other strong material having a high degree of resistance to the pasasge of radioactive particles and rays. The cover 50 is mounted upon the jack 52 which permits the cover 50 to be readily raised or lowered by an attendant stationed in the subterranean bombshelter 54. A series of stairs 56 extend downwardly into the interior of the subterranean bombshelter 54, as for example passing through the opening 58 in such subterranean bombshelter 54.

For maximum strength, the public bombshelter 10 should be supported by a massive annular inverted T-shaped bearing pile 60. Inasmuch as the bombshelter 10 is disposed above the subterranean bombshelter 54, and as the bombshelter 10 comprises a structure of great strength, the subterranean bombshelter 54 is provided with a high degree of protection against an explosion occurring above the surface of the earth.

The public bombshelter construction of the present invention provides maximum safety against flooding. Thus, in the event of flooding in the streets, but a few inches of water on the ground spread over a large area will effectively flood a conventional bombshelter and drown its occupants, while the subject bombshelter provides an effective water barrier against such flooding due to the raised ramps 28 and 32, the raised floor 36 of opening 34 and the raised floor 44 of opening 42, and finally the rectangular curb 48. Thus, the cover 50 is secured in water-tight relationship. During the initial stages of flooding, persons can enter public bombshelter 10 and descend into the subterranean bombshelter 54 without introducing water into the subterranean bombshelter 54 since the ramp 28 and the ramp 32 plus the other water barriers above-mentioned require the flood water to rise to a very high level. This is a particularly important consideration in the case of an atomic explosion, since the flood water will carry with it the contamination of radioactive particles.

Should the flooding of a city reach such an extreme as to have flood water pour over the rectangular curb 48, then the cover 50 should be permanently closed. However, until that stage, the public bombshelter 10 will provide a safe retreat for persons seeking shelter.

The presence of four separate and spaced entrances will enable persons to enter the bombshelter 10 even though some of the entrances are blocked with debris or rubble resulting from the atomic explosion.

The presence of the opening 34 at right angles to the entrances 20 and 26, and the presence of the opening 42 at right angles to the entrances 22 and 24 serve both to prevent the loading of rubble into the interior of the bombshelter 10 and to prevent the passage of gamma rays into the interior of the bombshelter 10. It is well established that gamma rays travel in a straight line. By offsetting the openings 34 and 42 in the manner indicated, gamma rays entering through the entrances 20 and 26 or 22 and 24 must still pass through a thickness of the bombshelter wall, namely through the buttresses 16 and 18 to enter the interior of the public bombshelter 10.

In Figure 5 there is shown a modified embodiment of the bombshelter 10 of the present invention. In this embodiment, in place of the ramps 28 and 32, there is substituted a series of steps 62 which extend upwardly from the reinforced floor 40 to the floor of the openings 34 and 42 (only opening 42 with its floor 44 is shown in Figure 5). A water barrier is provided between the base of each of the entrances at the reinforced floor level 40 and the surface of the floor of each of the openings 34 and 42.

Except for the substitution of the ramps 28 and 32 with the steps in the manner indicated, the public bombshelter shown in Figure 5 may be identical to that heretofore described and illustrated in Figures 1 through 4 inclusive.

The present invention may be embodied in other specific forms without departing from the spirit or essential attributes thereof and, accordingly, reference should be made to the appended claims, rather than to the foregoing specification as indicating the scope of the invention.

I claim:

1. In a bombshelter, a raised structure comprising an outer wall extending across a floor to form an enclosure therebetween, a passageway depending from the central portion of the floor of said raised structure to a subterranean bombshelter, a water barrier surrounding the entrance to said passageway, a plurality of spaced entrances in the outer wall of said raised structure in communication with the interior of said raised structure and the surrounding environment, wall buttresses for supporting said raised structure disposed between said entrances and said passageway, an opening through each of said wall buttresses, a raised plateau between each of said entrances and said openings, said plateaus being juxtaposed to said openings, the floor of said openings being raised above the raised plateaus, and an inclined way between each of said entrances and said raised plateaus, with said wall buttresses and inclined ways comprising water barriers between said entrances and said passageway.

2. In a bombshelter in accordance with claim 1 an additional inclined way intermediate each opening in each walled buttress and the passageway.

3. A bombshelter in accordance with claim 1 in which each of the openings through each of the walled buttresses is angularly disposed in respect to each of the entrances.

4. A bombshelter in accordanace with claim 1 in which the inclined way comprises a ramp intermediate the opening in the walled buttress and an entrance.

5. A bombshelter in accordance with claim 1 in which the inclined way comprises a plurality of steps intermediate the opening in the walled buttress and an entrance.

6. A bombshelter in accordance with claim 1 in which the entrance to the passageway depending from the central portion of the floor is provided with a removable cover which is below the top of the surrounding water barrier when the cover is in its closed disposition.

References Cited in the file of this patent

UNITED STATES PATENTS

| D. 167,565 | Feld | Aug. 26, 1952 |
| 871,977 | Winslow | Nov. 26, 1907 |
| 2,346,196 | Starret | Apr. 11, 1944 |
| 2,822,765 | Rudinger | Feb. 11, 1958 |

FOREIGN PATENTS

| 507,415 | Great Britain | June 12, 1939 |
| 863,227 | France | Oct. 10, 1938 |
| 864,756 | France | Jan. 27, 1941 |
| 975,060 | France | Oct. 11, 1950 |

OTHER REFERENCES

Engineering News-Record, May 10, 1951, page 27, "Precast Bomb Shelter."